(12) United States Patent  
Marte

(10) Patent No.: US 9,016,074 B2
(45) Date of Patent: Apr. 28, 2015

(54) ENERGY EXCHANGE SYSTEM AND METHOD

(71) Applicant: Energy Recovery Systems Inc., Coquitlam (CA)

(72) Inventor: Sean Douglas Marte, Langley (CA)

(73) Assignee: Energy Recovery Systems Inc., Coquitlam (CA)

(*) Notice: Subject to any disclaimer, the term of this patent is extended or adjusted under 35 U.S.C. 154(b) by 256 days.

(21) Appl. No.: 13/837,690

(22) Filed: Mar. 15, 2013

(65) Prior Publication Data

US 2014/0260357 A1 Sep. 18, 2014

(51) Int. Cl.
*F25B 7/00* (2006.01)
*F25B 29/00* (2006.01)

(52) U.S. Cl.
CPC .................... *F25B 29/003* (2013.01)

(58) Field of Classification Search
CPC .. F25B 29/003; F25B 2329/047; F25B 40/00; F25B 49/027; F25B 7/00
USPC .......... 62/79, 115, 190, 238.6, 434, 335, 513, 62/333; 165/10, 58, 63
See application file for complete search history.

(56) References Cited

U.S. PATENT DOCUMENTS

| | | | |
|---|---|---|---|
| 4,141,222 A | 2/1979 | Ritchie | |
| 4,148,436 A * | 4/1979 | Shaw | 237/2 B |
| 4,220,011 A * | 9/1980 | Bergman et al. | 62/185 |
| 4,265,094 A | 5/1981 | Haasis, Jr. | |
| 4,320,630 A | 3/1982 | Uselton et al. | |
| 4,330,309 A | 5/1982 | Robinson, Jr. | |
| 4,373,346 A * | 2/1983 | Hebert et al. | 62/79 |
| 4,416,222 A | 11/1983 | Staats | |
| 4,431,390 A | 2/1984 | Hart | |
| 4,685,307 A | 8/1987 | Jones | |
| 4,972,683 A | 11/1990 | Beatenbough | |
| 5,050,394 A | 9/1991 | Dudley et al. | |
| 5,115,644 A | 5/1992 | Alsenz | |
| 5,241,829 A * | 9/1993 | Irie et al. | 62/79 |
| 5,305,614 A | 4/1994 | Gilles | |
| 5,333,677 A * | 8/1994 | Molivadas | 165/272 |
| 5,457,964 A * | 10/1995 | Hyde | 62/86 |
| 5,575,159 A | 11/1996 | Dittell | |

(Continued)

FOREIGN PATENT DOCUMENTS

CA 2229355 C 2/1999
CA 2574996 A1 12/2006

(Continued)

OTHER PUBLICATIONS

Carlyle Compressor—Smart Unloading Controller Application Guide; Dec. 22, 2011.

(Continued)

*Primary Examiner* — Mohammad M Ali
(74) *Attorney, Agent, or Firm* — Perry + Currier Inc.

(57) ABSTRACT

A system and method for heating water are provided. The system includes a first subcooler for receiving a first water flow, a second subcooler for receiving a second water flow, a first condenser in fluid communication with the first subcooler and the second subcooler for receiving water from both subcoolers, and a second condenser in fluid communication with the first condenser. The method involves receiving a flow of water, and transferring heat to the water using the system.

20 Claims, 12 Drawing Sheets

(56) References Cited

U.S. PATENT DOCUMENTS

| | | | |
|---|---|---|---|
| 5,622,057 A | 4/1997 | Bussjager et al. | |
| 5,758,820 A | 6/1998 | Celorier, Jr. et al. | |
| 5,806,331 A | 9/1998 | Brown | |
| 5,906,104 A | 5/1999 | Schwartz et al. | |
| 6,209,334 B1 * | 4/2001 | Cowans et al. | 62/224 |
| 6,381,970 B1 | 5/2002 | Eber et al. | |
| 6,711,911 B1 | 3/2004 | Grabon et al. | |
| 7,028,490 B2 * | 4/2006 | Tomlinson | 62/115 |
| 7,334,419 B2 | 2/2008 | Gordon et al. | |
| 7,644,591 B2 | 1/2010 | Singh et al. | |
| 7,845,179 B2 | 12/2010 | Singh et al. | |
| 7,908,881 B2 | 3/2011 | Kopko | |
| 8,250,879 B2 | 8/2012 | MacBain et al. | |
| 2001/0039809 A1 | 11/2001 | Wada et al. | |
| 2003/0077179 A1 | 4/2003 | Collins et al. | |
| 2005/0183432 A1 * | 8/2005 | Cowans et al. | 62/190 |
| 2008/0196871 A1 | 8/2008 | Lavanchy et al. | |
| 2008/0296396 A1 | 12/2008 | Corroy et al. | |
| 2009/0232663 A1 | 9/2009 | Mirsky et al. | |
| 2009/0293515 A1 * | 12/2009 | Lifson et al. | 62/117 |
| 2010/0018228 A1 * | 1/2010 | Flammang et al. | 62/115 |
| 2010/0193152 A1 | 8/2010 | Singleton, Jr. et al. | |
| 2011/0132007 A1 | 6/2011 | Weyna et al. | |
| 2011/0209485 A1 | 9/2011 | Lifson et al. | |
| 2011/0209491 A1 * | 9/2011 | Maire | 62/238.7 |
| 2012/0216551 A1 * | 8/2012 | Minor et al. | 62/79 |
| 2012/0255320 A1 | 10/2012 | Kawagoe et al. | |

FOREIGN PATENT DOCUMENTS

| | | |
|---|---|---|
| CN | 101240949 A | 8/2008 |
| EP | 1801515 A1 | 6/2007 |
| GB | 2052712 A | 1/1981 |
| JP | 8233408 A | 9/1996 |
| JP | 2011058649 A | 3/2011 |
| WO | 2004051148 A1 | 6/2004 |
| WO | 2011127553 A1 | 10/2011 |
| WO | 2011127571 A1 | 10/2011 |
| WO | 2012135933 A2 | 10/2012 |

OTHER PUBLICATIONS

Frick Quantum LX Compressor Control Panel Version 7.0x; Operation (Session Level 2); Service Manual Jun. 2011.

McQuay AirConditioning; Centrifugal Compressor Water Chillers Catalog; CAT WSCWDC-7; Jan. 2009.

PCT International Application No. PCT/CA2010/000605 Search Report dated Jan. 19, 2011.

PCT International Application No. PCT/CA2010/000605 Written Opinion dated Jan. 19, 2011.

PCT International Application No. PCT/CA2010/000605 International Preliminary Report on Patentability dated Sep. 21, 2012.

PCT International Application No. PCT/CA2011/000403 International Search Report dated Jul. 13, 2011.

PCT International Application No. PCT/CA2011/000403 Written Opinion dated Jul. 13, 2011.

PCT International Application No. PCT/CA2011/000403 International Preliminary Report on Patentability dated Sep. 21, 2012.

PCT International Application No. PCT/CA2011/000406 International Search Report dated Dec. 13, 2011.

PCT International Application No. PCT/CA2011/000406 Written Opinion dated Dec. 13, 2011.

PCT International Application No. PCT/CA2011/000406 Second Written Opinion dated May 8, 2013.

\* cited by examiner

ENERGY EXCHANGE SYSTEM AND METHOD

FIELD

The present invention relates generally to energy exchange and distribution systems including heating, ventilation, air-conditioning and water heating, and more particularly relates to an energy exchange system for transparent incorporation into a water heating system.

BACKGROUND

It is known to employ energy exchange technologies in order to, for example, recover excess heat energy from an air-conditioning system to provide energy to heat water. Many examples of such heat-exchange technologies came about in the early 1980s which reflect the end of the energy crises of the 1970s. It is interesting to note that these heat-exchange technologies have not been generally adopted.

SUMMARY

In accordance with an aspect of the invention, there is provided a system for heating water. The system includes a first subcooler for receiving a first water flow. The first subcooler is configured to transfer heat to the first water flow at a first heat transfer rate. The system also includes a second subcooler for receiving a second water flow. The second subcooler is configured to transfer heat to the second water flow at a second heat transfer rate. The system further includes a first condenser in fluid communication with the first subcooler and the second subcooler. The first condenser is configured to receive a combined water flow. The combined water flow includes the first water flow from the first subcooler and the second water flow from the second subcooler. The first condenser is further configured to transfer heat to the combined water flow at a third heat transfer rate. Furthermore, the system includes a second condenser in fluid communication with the first condenser. The second condenser is configured to receive the combined water flow from the first condenser. Furthermore, the second condenser is configured to transfer heat to the combined water flow at a fourth heat transfer rate The first subcooler may be configured to transfer heat from a first refrigerant to the first water flow. The first condenser may be configured to transfer heat from the first refrigerant to the combined water flow.

The second subcooler may be configured to transfer heat from a second refrigerant to the second water flow. The second condenser may be configured to transfer heat from the second refrigerant to the combined water flow.

The system may further include a first evaporator and a second evaporator. The first evaporator may be for evaporating the first refrigerant. The second evaporator may be for evaporating the second refrigerant.

At least one of the first evaporator and the second evaporator may be configured to receive waste heat from a chiller system.

The system may further include a first connector and a second connector. The first connector may be for connecting a cold water source to the first subcooler and the second subcooler to receive the water. The second connector may be for connecting the chiller system to the evaporator for receiving the waste heat.

The second connector may be configured to receive a liquid.

The system may further include a first compressor and a second compressor. The first compressor may be for compressing the first refrigerant. The second compressor may be for compressing the second refrigerant.

The second compressor may compress the second refrigerant to a higher pressure than the first compressor compresses the first refrigerant.

The first condenser, the first subcooler, the first evaporator and the first compressor form a first refrigerant circuit.

The first refrigerant circuit may be a closed circuit.

The first portion of water may be equal to the second portion of water.

The first heat transfer rate, the second heat transfer rate, the third heat transfer rate, and the fourth heat transfer rate may be cumulatively sufficient for increasing a temperature of the combined water flow by at least 30° C.

The first heat transfer rate, the second heat transfer rate, the third heat transfer rate, and the fourth heat transfer rate may be cumulatively sufficient for increasing a temperature of the combined water flow by at least 40° C.

In accordance with an aspect of the invention, there is provided a method of heating water. The method involves receiving, at a first subcooler, a first water flow. The method also involves transferring heat at a first heat transfer rate to the first water flow through the first subcooler. The method further involves receiving, at a second subcooler, a second water flow. Furthermore, the method involves transferring heat at a second heat transfer rate to the second water flow through the second subcooler. In addition, the method involves receiving, at the first condenser, a combined water flow. The combined water flow includes the first water flow from the first subcooler and the second water flow from the second subcooler. The method further involves transferring heat at a third heat transfer rate to the combined water flow through the first condenser. The method additionally involves receiving, at the second condenser, the combined water flow from the first condenser. The method further involves transferring heat at a third heat transfer rate to the combined water flow through the second condenser.

Transferring heat to the first water flow through the first subcooler and transferring heat to the combined water flow through the first condenser may involve transferring heat from a first refrigerant.

Transferring the heat to the second water flow through the second subcooler and transferring heat to the combined water flow through the second condenser may involve transferring heat from a second refrigerant.

The method may further involve compressing the second refrigerant to a higher pressure than the first compressor compresses the first refrigerant.

The method may further involve increasing a temperature of the water by at least 30° C. by transferring heat to the first water flow through the first subcooler, transferring heat to the second water flow through the second subcooler, transferring heat to the combined water flow through the first condenser, and transferring heat to the combined water flow through the second condenser.

BRIEF DESCRIPTION OF THE DRAWINGS

Reference will now be made, by way of example only, to the accompanying drawings in which.

DETAILED DESCRIPTION OF THE EMBODIMENTS

Figure 1:
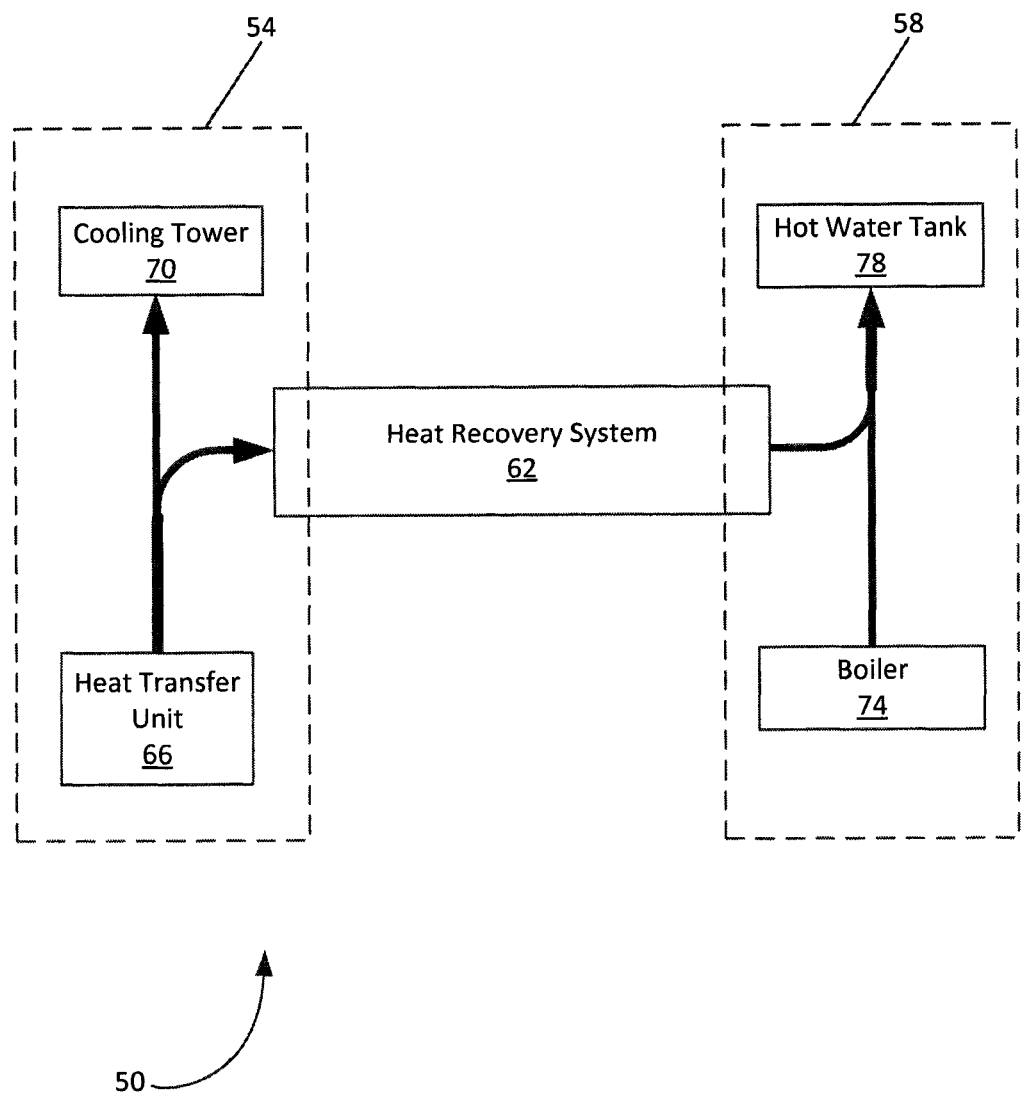
FIG. 1 is a schematic representation of an exemplary energy exchange system in accordance with an embodiment.

Referring now to FIG. 1, a schematic representation of an energy exchange system for transferring heat energy is shown generally at 50. It is to be understood that the energy exchange system 50 is purely exemplary and that it will be apparent to those skilled in the art that a variety of energy exchange systems are contemplated. The energy exchange system 50 includes a chiller system 54, a hot water system 58, and a heat recovery system 62.

In the present embodiment, the chiller system 54 includes a heat transfer unit 66 and a cooling tower 70. It is to be appreciated, with the benefit of this description, that chiller system 54 is not particularly limited to any particular structural configuration and that variations capable of removing heat energy from a space are contemplated. The foregoing description of the structure of the chiller system 54 is intended to describe a cooling system that can be employed to provide a cooling system in a building such as a hotel, office building, residential home, or industrial building having a plurality of spaces, such as rooms. In particular, the chiller system 54 is generally configured to remove heat energy from a space using the heat transfer unit 66. The heat energy removed from the space is generally considered to be waste heat and is generally expelled by the chiller system 54 at the cooling tower 70 into another space such as the exterior of the building where temperature is not controlled.

Accordingly, it is to be understood that the actual implementations of the chiller system 54 can vary according a number of variables, including the size of each space, the size and manufacturer of the heat transfer unit 66, and cooling tower 70. Therefore, notwithstanding the description provided, the specific embodiment for a given structure will be expected to be different, and possibly substantially different, for each and every structure. For example, although the present embodiment shown in FIG. 1 shows a single heat transfer unit 66, it is to be understood that the chiller system 54 can include a plurality of heat transfer units, each heat transfer unit being capable of independent control. Independent control can provide for varying rates of heat transfer at each heat transfer unit to allow for a variation of temperature across different spaces within a structure. In one example, independent variation and control of the temperature across different spaces can provide for independent temperature control in different rooms within a building while using a single chiller system 54. Similarly, although the present embodiment shown in FIG. 1 shows a single cooling tower 70, it is to be understood that the cooling tower 70 can include a plurality of cooling towers.

In the present embodiment, the hot water system 58 includes a boiler 74 for heating water in a hot water tank 78. Similar to the chiller system 54, it is to be appreciated that the hot water system 58 is not particularly limited to any particular structural configuration and that variations capable of removing heat energy from a space are contemplated. For example, the hot water system 58 can omit the hot water tank 78 and instead be a tankless system where a heat source provides hot water on demand. As another example, the boiler 74 can be another heat source capable of heating water, or the boiler 74 can be omitted in embodiments where the heat recovery system 62 can supply sufficient heat energy to the hot water tank 78.

In general terms, the heat recovery system 62 is configured to transfer at least a portion of the waste heat from the chiller system 54 to the hot water system 58. However, it is to be re-emphasized that the structure shown in FIG. 1 is a schematic, non-limiting representation only. For example, although a single chiller system 54 and one hot water system 58 are shown in FIG. 1, it is to be understood that the energy exchange system 50 can include a plurality of chiller systems and/or a plurality of hot water systems. In such embodiments, each chiller system and/or hot water system can be configured to operate in a portion of a building or complex where a single chiller system and/or hot water system is not sufficient. Indeed, a plurality of different configurations of energy exchange system 50 is contemplated herein.

It is to be appreciated, with the benefit of this description, that the heat recovery system 62 is generally configured to operate between the chiller system 54 and the hot water system 58. Without the heat recovery system 62, the chiller system 54 and the hot water system 58 can operate independently to cool a space within a building and provide hot water, respectively. However, by independently operating the chiller system 54 and the hot water system 58 without the heat recovery system 62, power would need to be supplied to each of the chiller system 54 and the hot water system 58 independently, usually in the form of electricity for the chiller system 54 and usually in the form of burning a fossil fuel such as natural gas or diesel for the hot water system 58. By transferring some of the waste heat generated in the chiller system 54 to the hot water system 58, it is to be appreciated, that the amount of power required to heat the water using the boiler 74 would be reduced. Accordingly, the heat recovery system 62 can be installed in a building having existing systems with low costs since the existing equipment in a building does not need to be replaced. Furthermore, since the existing equipment is not replaced, reverting to the original configuration for heating water solely using the boiler 74 would be simple, such as during a failure of the heat recovery system 62 or during a scheduled maintenance requiring the heat recovery system 62 to be offline.

Figure 2:
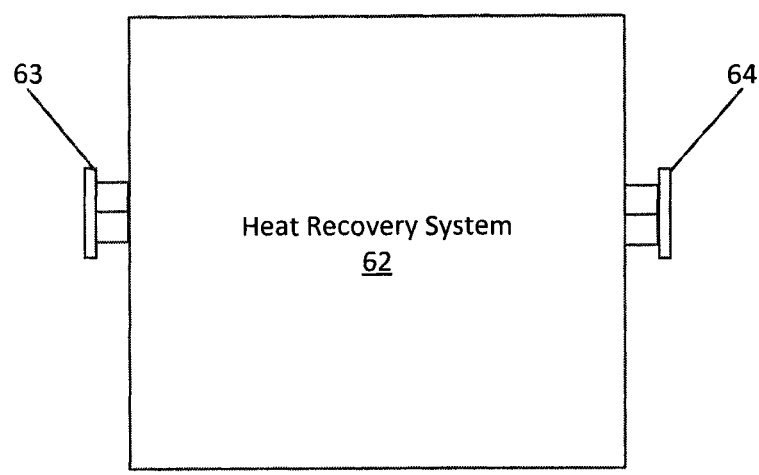
FIG. 2 is a schematic representation of a heat recovery system in accordance with an embodiment.

Referring to FIG. 2, a representation of the heat recovery system 62 can include a chiller connector 63 for connecting to the chiller system 54 and a water connector 64 for connecting to the hot water system 58. The chiller connector 63 to the chiller system 54 is generally configured to receive waste heat from the chiller system 54. For example, the waste heat can be transferred using a medium such as a liquid, forced air or through thermal conduction. The water connector 64 to the hot water system 58 can include a connection from the boiler 74 to the hot water tank 78. It is to be appreciated that in some hot water systems, the boiler 74 can be incorporated within the hot water tank 78 such that the heat recovery system 62 receives water directly from a cold water source (not shown) for delivery to the hot water tank 78. By providing the chiller connector 63 and the water connector 64, it is to be appreciated that the heat recovery system can be simply incorporated in a wide variety of buildings without the need for modifications to the existing chiller system 54 or the hot water system 58.

It is to be re-emphasized that the embodiment shown in FIG. 2 is purely exemplary and that variations are contemplated. For example, it is to be appreciated that the chiller connector 63 and the water connector 64 are optional and can be omitted in some embodiments of the heat recovery system 62. As another example, the chiller connector 63 has an inlet and an outlet for the waste heat and the water connector 64 has an inlet and an outlet. In other embodiments, the chiller connector 63 and the water connector 64 can be a plurality of connectors where the inlet and the outlet are provided using separate connectors.

Figure 3:
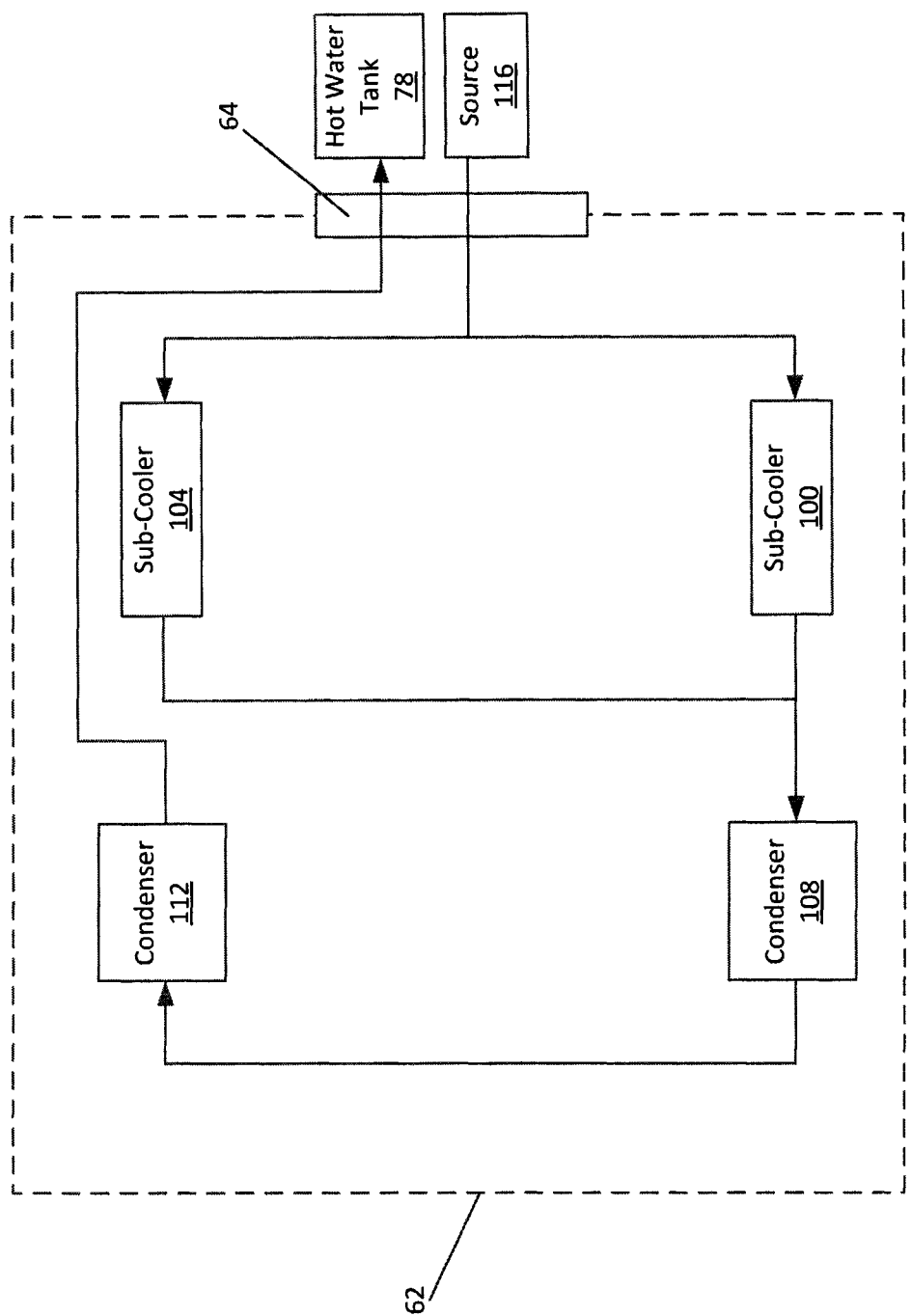
FIG. 3 is a schematic representation of water flow through the heat recovery system of the embodiment shown in FIG. 2.

Referring to FIG. 3, a schematic representation showing the flow of water through an embodiment of the heat recovery system 62 is shown in greater detail. In particular, FIG. 3 illustrates the flow of water through the heat recovery system 62. It is to be understood that the heat recovery system 62 is purely exemplary and it will be apparent to those skilled in the art that a variety of heat recovery systems are contemplated including other embodiments discussed in greater detail below. The heat recovery system 62 includes a first subcooler 100, a second subcooler 104, a first condenser 108, and a second condenser 112.

In general, the heat recovery system 62 is configured to receive water from a water source 116 and add waste heat from another system, such as the chiller system 54, to the water for increasing the temperature of the water. The water source 116 is not particularly limited. For example, the water source 116 can include a municipal water source. In other embodiments, the water source 116 can be a well or water tower. In some embodiments, the heated water can be provided to the boiler 74 for further supplemental heat energy if the heat exchange system 62 cannot provide sufficient temperature or heat energy to the water at the rate required due to a demand for hot water. Alternatively, the heat recovery system can be connected between the hot water tank 78 and the boiler 74 such that prior to receiving the water from the water source 116, the water can pass through the boiler 74 to receive supplemental heat energy if required. Upon entering the heat recovery system 62, the water is generally passed through the first subcooler 100, the second subcooler 104, the first condenser 108, and the second condenser 112, where heat energy is added to the water. The manner by which waste heat from the chiller system 54 is added to the water is not particularly limited. In the present embodiment, the first and second condensers 108, 112 condense a gaseous refrigerant into a liquid. The heat energy released by the phase change is transferred to the water by thermal conduction. The first and second subcoolers 100, 104 transfer heat energy from the liquid refrigerant to the water by thermal conduction since the liquid refrigerant is configured to be at a higher temperature than the incoming water. After the water has been heated, the heat recovery system 62 delivers the hot water to the hot water tank 78.

Figure 4:
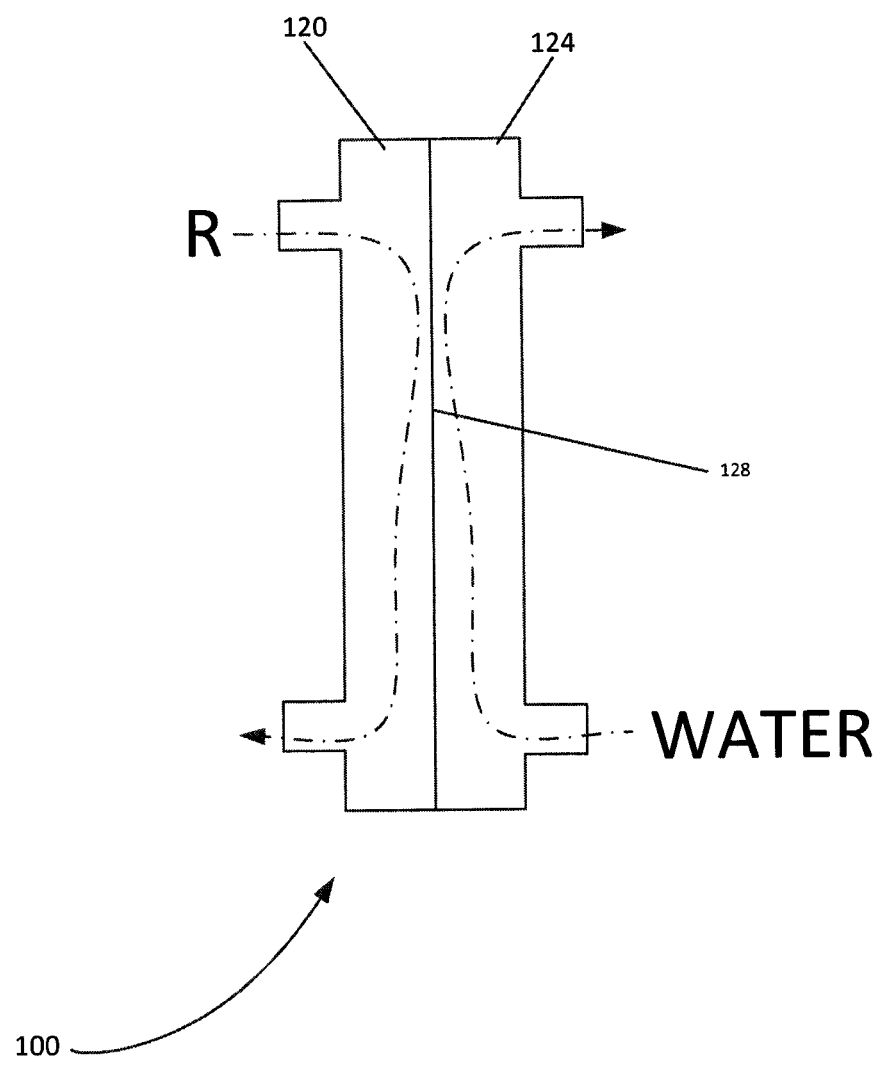
FIG. 4 is a schematic representation a subcooler in accordance with an embodiment.

In the present embodiment, the first subcooler 100 is configured to receive at least a portion of the water from the water source 116. In particular, the first subcooler 100 is configured to receive a flow of water therethrough. The manner by which the water from the water source 116 is divided to provide the first subcooler 100 with a portion is not particularly limited. For example, in the present embodiment, a tee connector can be used to divide the flow of water from the water source 116 into approximately equal portions. The first subcooler 100 is further configured to transfer heat to the portion of the water received. The manner by which heat energy is transferred is not particularly limited. For example, in the present embodiment, the first subcooler 100 can include a first compartment 120 through which refrigerant flows and a second compartment 124 through which water flows as shown in FIG. 4. It is to be appreciated, with the benefit of this description, that the temperature of the refrigerant is greater than the temperature of the water for water heating purposes. Accordingly, as the water and refrigerant are in thermal communication, the water will receive heat energy from the refrigerant and increase in temperature whereas the refrigerant will give off heat energy and subcool.

The two compartments 120, 124 are separated by a wall 128 configured to transfer heat from the first compartment 120 to the second compartment 124. The rate at which heat energy is transferred is not particularly limited and can depend on several factors such as the material, size and geometry of the wall 128, as well as the relative temperatures of the two compartments 120, 124. The wall 128 is constructed from materials which can separate the two compartments while providing high thermal conductivity. Some examples of suitable materials include copper, stainless steel, aluminum, and other materials of high thermal conductivity. The exact configuration of the two compartments 120, 124 is not particularly limited. In the present embodiment, the two compartments 120, 124 are configured such that the refrigerant and the water flow in opposite directions. In other embodiments, the configuration of two compartments 120, 124 can be arranged such that the refrigerant and the water flow in the same direction. In further embodiments, more compartments can be added to form alternating layers of refrigerant flow and water flow. The two compartments 120, 124 can also be configured to follow a tortuous route and may be provided with internal fins or other protrusions to increase heat transfer efficiency.

It is to be re-emphasized that the structure shown in FIG. 4 is a schematic, non-limiting representation only and that variations are contemplated. Since the oil in the refrigerant can be considered a toxin and the water flowing through the first subcooler 100 from the hot water system 58 contains potable water, additional features can be added to ensure the separation to the first compartment 120 and the second compartment 124. For example, in other embodiments, the first subcooler 100 can include a double walled and an air gap such that a leak in one of the walls will allow water or refrigerant to leak to atmosphere but contamination of the potable water is prevented. As another example, further embodiments can include an additional heat transfer mechanism (not shown) can be installed between the hot water system 58 and the heat recovery system 62 to transfer the waste heat recovered by the heat recovery system 62 such that the additional heat transfer mechanism acts as an barrier to prevent contamination of the potable water.

Referring again to FIG. 3, the second subcooler 104 is configured to receive at least a portion of the water from the water source 116 similar to the first subcooler 100. In particular, the first subcooler 100 is configured to receive a flow of water therethrough. The second subcooler is further configured to transfer heat energy to the portion of the water received similar to the first subcooler 100. It is to be appreciated that the second subcooler 104 is not particularly limited and can be similar or identical to the first subcooler 100. It is to be re-emphasized that the present embodiment is a non-limiting embodiment and that the first subcooler 100 and the second subcooler 104 can be different from described. For example, the first subcooler 100 and the second subcooler 104 can be of different sizes, from different manufacturers, of a different type.

It is to be appreciated, with the benefit of this description, that the water from the water source 116 flows into each of the first subcooler 100 and the second subcooler 104 in parallel. In the present embodiment, approximately half of the water from the water source 116 flows into each of the first subcooler 100 and the second subcooler 104. However, in other embodiments, the flow can be configured such that the amount of water flowing into the first subcooler 100 is more or less than the amount of water flowing into the second subcooler 104. For example, in situations where the first subcooler 100 and the second subcooler 104 are each configured to transfer heat energy at a different rate, the amount of water flowing into each of the first subcooler 100 and the second subcooler 104 can be adjusted such that the temperature of the water leaving each of the first subcooler 100 and the second subcooler 104 is similar. However, in the present embodiment, the water from each of the first subcooler 100 and the second subcooler 104 is combined after the water passes through the subcoolers 100, 104 and natural fluid mixing averages the temperature of the combined water flow. The manner by which the water from the subcoolers 100, 104 is combined is not particularly limited. For example, in the present embodiment, a tee connector can be used receive the portions of water from each of the subcoolers 100, 104 to combine at a single outlet.

Figure 5:
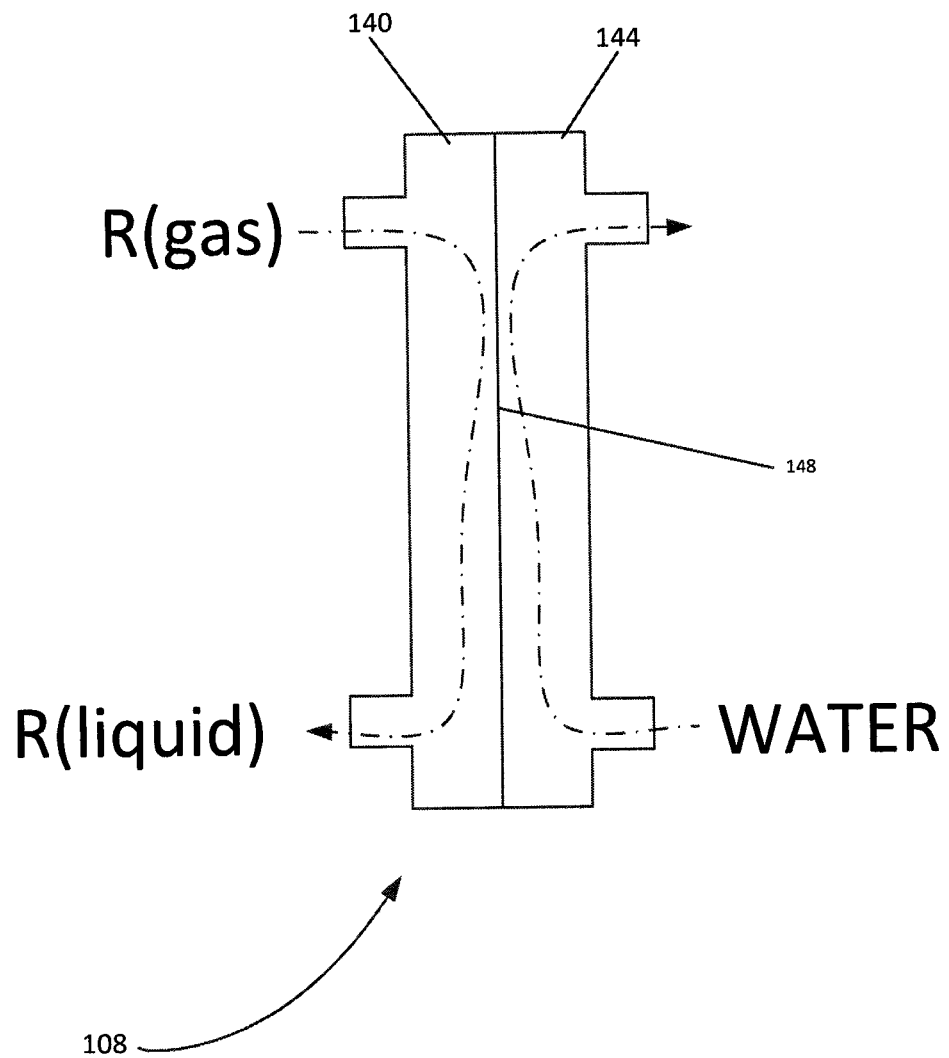
FIG. 5 is a schematic representation a condenser in accordance with an embodiment.

The first condenser 108 is in fluid communication with both the first subcooler 100 and the second subcooler 104. The first condenser 108 configured to receive the portion of water passing through the first subcooler 100 and the portion of water passing through the second subcooler 104. In particular, the first condenser 108 is configured to receive a combined water flow therethrough. The manner by which the first condenser receives the water from the first subcooler 100 and the second subcooler 104 is not particular limited. In the present embodiment, piping is used to combine the partially heated water portions from the first subcooler 100 and the second subcooler 104 and subsequently direct the water to the first condenser 108. The first condenser 108 is further configured to transfer more heat energy to the partially heated from the first subcooler 100 and the second subcooler 104. The manner by which heat energy is transferred is not particularly limited. For example, in the present embodiment, the first condenser 108 can include a first compartment 140 into which gaseous refrigerant enters and a second compartment 144 through which the water flows as shown in FIG. 5. It is to be appreciated, with the benefit of this description, that the lower temperature of the water relative to the gaseous refrigerant causes the refrigerant to condense on the wall 148, which is configured to transfer heat energy between the first compartment 140 and the second compartment 144. The rate at which heat energy is transferred is not particularly limited and can depend on several factors such as the material, size and geometry of the wall 148, as well as the relative temperatures of the two compartments 140, 144. Accordingly, this phase change releases heat energy from the refrigerant, which is transferred to the water to increase the temperature of the water.

The wall 148 is typically constructed from materials which can separate the two compartments while providing high thermal conductivity. Some examples of suitable materials include copper, stainless steel, aluminum, and other similar materials. The exact configuration of the two compartments 140, 144 is not particularly limited. In the present embodiment, the two compartments 140, 144 are configured such that the refrigerant and the water flow in opposite directions. In other embodiments, the configuration of two compartments 140, 144 can be configured such that the refrigerant and the water flow in the same direction. However, it is to be appreciated that since liquid refrigerant is collected, gravity can be used to collect the liquid refrigerant. In further embodiments, more compartments can be added to form alternating layers of refrigerant flow and water flow or a shell and tube type condenser can be used. The two compartments 140, 144 may also be configured to follow a tortuous route and may be provided with internal fins or other protrusions to increase heat transfer efficiency.

The second condenser 112 in fluid communication with the first condenser 108 and is configured to receive the combined water flow after heat energy was by added the first condenser 108. The second condenser 112 is configured to transfer heat energy to the water similar to the first condenser 108 to further increase the temperature of the water. It is to be appreciated that the second condenser 112 is not particularly limited and can be similar or identical to the first condenser 108. It is to be re-emphasized that the present embodiment is a non-limiting embodiment and that the first condenser 108 and the second condenser 112 can be different from described. For example, the first condenser 108 and the second condenser 112 can be different sizes, from different manufacturers, of a different type, such as a shell and tube condenser.

It is to be appreciated, with the benefit of this description, that the water from the first subcooler 100 and the second subcooler 104 flows through the first condenser 108 and then the second condenser 112 in series. Accordingly each of the first condenser 108 and the second condenser 112, adds heat energy to the water to further increase the temperature of the water prior to delivering hot water to the hot water tank 78. By adding heat energy to the water in steps, it is to be appreciated that the heat recovery system 62 can consume less energy than if the water were to be increased to the desired temperature in a single step.

Furthermore, it is to be understood by a person of skill in the art and with the benefit of this specification, that for a heat recovery application the combined water flow into and out of each of the condensers 108, 112 are typically fixed. In particular, the rate of the combined water flow is generally determined by the size of the unit (i.e. 150 tons) because the product to be consumed is hot water. In addition, it is to be understood that the temperature of the combined water leaving each of the condensers 108, 112 can affect the efficiency of the heat recovery system 62 such that a lower temperature leads to a higher efficiency. However, in a heat recovery application, the temperatures of the combined water leaving each of the condensers 108, 112 are generally fixed by the temperature at which hot water is demanded.

In general terms, the heat recovery system 62 is generally configured to add heat energy to water from a water source 116 and deliver it to the hot water tank 78. It is to be re-emphasized that the structure shown in FIGS. 3 to 5 is a non-limiting representation only. Notwithstanding the specific example, it is to be understood that other mechanically equivalent structures and heat transfer mechanisms can be devised to perform the same function as the heat recovery system 62. For example, the manner by which waste heat is collected from the chiller system 54 is not particularly limited. In general, the refrigerant is configured to receive heat energy from the chiller system 54 and transferred to the water using various different system configurations which will be discussed in greater detail below.

Figure 6:
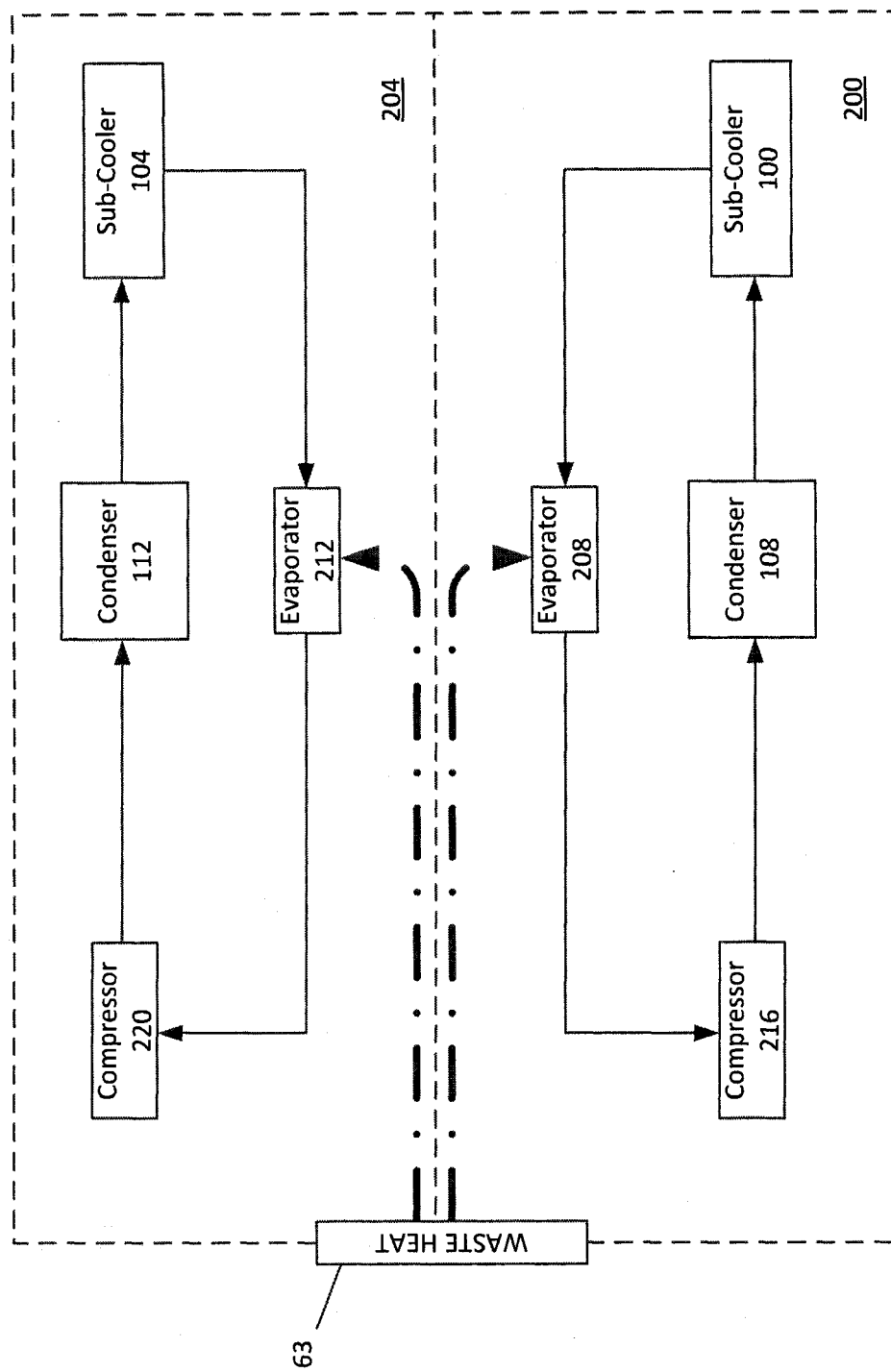
FIG. 6 is a schematic representation of refrigerant flow through the heat recovery system of the embodiment shown in FIG. 2.

Referring to FIG. 6, a schematic representation showing the flow of refrigerant through the embodiment of the heat recovery system 62 is shown in greater detail. It is to be re-emphasized that the heat recovery system 62 is purely exemplary and it will be apparent to those skilled in the art that a variety of configurations are contemplated including other embodiments discussed in greater detail below. In the present embodiment, the heat recovery system 62 includes a first refrigerant circuit 200 and a second refrigerant circuit 204. In the present embodiment, each of the first refrigerant circuit 200 and the second refrigerant circuit 204 is a closed circuit such that the amount of refrigerant in each of the first refrigerant circuit 200 and the second refrigerant circuit 204 is separated and does not leave or enter the first refrigerant circuit 200 and the second refrigerant circuit 204.

The first refrigerant circuit 200 includes the first subcooler 100, the first condenser 108, a first evaporator 208, and a first compressor 216. The first refrigerant circuit 200 is generally configured to transfer heat energy from the chiller system 54 to the water passing through the first subcooler 100 and the first condenser 108 using a refrigerant. The refrigerant used is not particularly limited. In the present embodiment, the refrigerant used in the first refrigerant circuit 200 is a haloalkane refrigerant such as R-134a. In other embodiments, the refrigerant can be substituted with another suitable refrigerant such as R-12, R-409A, or R-414A. As shown in FIG. 6, the refrigerant flows in a circuit from the first compressor 216 to the first condenser 108 to the first subcooler 100 to first evaporator 208 and back to the first compressor 216.

The first evaporator 208 is in thermal communication with the chiller system 54. The first evaporator 208 is not particularly limited and is generally configured to evaporate liquid refrigerant received from the first subcooler 100 into a gas. The heat energy required for the phase change is provided by the waste heat of the chiller system 54. The manner by which the waste heat from the chiller system is received by the first evaporator 208 is not particularly limited. In the present embodiment, the first evaporator 208 is disposed along the path by which the waste heat is transferred from the heat transfer unit 66 to the cooling tower 70. It is to be appreciated that by position the first evaporator 208 in the chiller system 54 as described, at least a portion of the waste heat will be received by the first evaporator 208 and used toward evaporating the refrigerant in the first refrigerant circuit 200. In another embodiment, an additional heat transfer mechanism (not shown) can be installed between the chiller system 54 and the heat recovery system 62 to transfer the waste heat to the heat recovery system 62. For example, a liquid with a high heat capacity can be used to absorb and transfer the heat energy between the chiller system 54 and the heat recovery system.

The first compressor 216 is generally configured to move the refrigerant through the first refrigerant circuit 200. In addition, the first compressor 216 is configured to compress the refrigerant into a hot, high-pressure refrigerant gas for delivery to the first condenser 108. It is to be understood that the first compressor 216 is not particularly limited. In the present embodiment, the first compressor 216 is a rotary screw compressor with a slider for capacity control. However, in other embodiments, the first compressor 216 can be a reciprocating compressor, a centrifugal compressor, or a scroll compressor with a variable-speed motor, a two-speed motor or unloaders for capacity control.

The second refrigerant circuit 204 includes the second subcooler 104, the second condenser 112, a second evaporator 212, and a second compressor 220. The second refrigerant circuit 204 is generally configured to transfer heat energy from the chiller system 54 to the water passing through the second subcooler 104 and the second condenser 112 using a refrigerant. The refrigerant used is not particularly limited and can be of the same type of refrigerant as used in the first refrigerant circuit. Alternatively, the refrigerant used in the second refrigerant circuit 204 can be a different. As shown in FIG. 6, the refrigerant flows in a circuit from the second compressor 220 to the second condenser 112 to the second subcooler 104 to second evaporator 212 and back to the first compressor 220.

The second evaporator 212 is in thermal communication with the chiller system 54 similar to the first evaporator 208. The second evaporator 212 is not particularly limited and is generally configured to evaporate liquid refrigerant received from the second subcooler 104 into a gas. It is to be appreciated that the second evaporator 212 is not particularly limited and can be similar or identical to the first evaporator 208. It is to be re-emphasized that the present embodiment is a non-limiting embodiment and that the first evaporator 208 and the second evaporator 212 can be different from described. For example, the first evaporator 208 and the second evaporator 212 can be different sizes, from different manufacturers, of a different type.

The second compressor 220 is generally configured to move the refrigerant through the second refrigerant circuit 204. In addition, the second compressor 220 is configured to compress the refrigerant into a hot, high-pressure refrigerant gas for delivery to the second condenser 112. It is to be understood that the second compressor 220 is not particularly limited. In the present embodiment, the second compressor 220 is a rotary screw compressor with a slider for capacity control. However, in other embodiments, the first compressor 216 can be a reciprocating compressor, a centrifugal compressor, or a scroll compressor with a variable-speed motor, a two-speed motor or unloaders for capacity control. Furthermore, although the first compressor 216 and the second compressor 220 are identical in the present embodiment, it is to be understood that either one of the compressors 216, 220 can be a different type. In particular, since the parameters of the first refrigerant circuit 200 and the second refrigerant circuit 204 are different as discussed below, the first compressor 216 and the second compressor 220 can each be independently optimized for the first refrigerant circuit 200 and the second refrigerant circuit 204, respectively.

In transferring heat energy at the first condenser 108 and second condenser 112, the temperature of the water should optimally be raised to the temperature at which the refrigerant undergoes the phase change giving off heat (condensation temperature). It is to be appreciated that since the water temperature in the two condensers 108, 112 are not equal to each other, the pressure to which the refrigerant in the first refrigerant circuit 200 and the second refrigerant circuit 204 must be compressed will not be equal. Since the temperature to which the water in the second condenser 112 is to be raised is higher, the pressure to which the refrigerant in the second refrigerant circuit 204 is raised is higher.

In the present embodiment, the parameters of the hot water system 58 determine the amount that the temperature of the water is to be raised, which ultimately determines the cumulative amount of heat energy added to the water. In particular, since the water is generally flowing, a heat transfer rate would need to be determined based on the flow rate of the water. For example, if the cold water source 116 supplies water at about 25° C. and the hot water tank 78 is configured to store water at a temperature of about 55° C., then sufficient heat energy is added to raise the temperature of the amount of water by about 30° C. As another example, if the hot water tank 78 is configured to store water at a temperature of about 60° C., sufficient heat energy is added to raise the temperature of the amount of water by about 35° C. As another example, if the hot water tank 78 is configured to store water at a temperature of about 65° C., sufficient heat energy is added to raise the temperature of the amount of water by about 40° C. It is to be appreciated that different applications can demand different temperatures of water and that some buildings can have a plurality of water tanks, each water tank maintaining the temperature of the water at a different temperature.

Since the second refrigeration circuit requires greater compression, it is to be understood that the second compressor 220 compresses the refrigerant to a higher pressure than the first compressor 216. If both condensers were required to operate at the higher temperature required for delivery into the hot water tank 78 (such as if the water flows in parallel through the condensers instead of in series), both the first compressor 216 and the second compressor 220 would need to operate at the higher pressure. Accordingly, by providing a two step process, at two different condensation temperatures in condensers 108, 112, the heat recovery system 62, only the second compressor 220 compresses the refrigerant to a high pressure. Due to the lower pressure in condenser 108, it is to be appreciated, with the benefit of this description, that less power would be required by the first compressor 216 than the second compressor 220 resulting in further energy savings.

Figure 7:
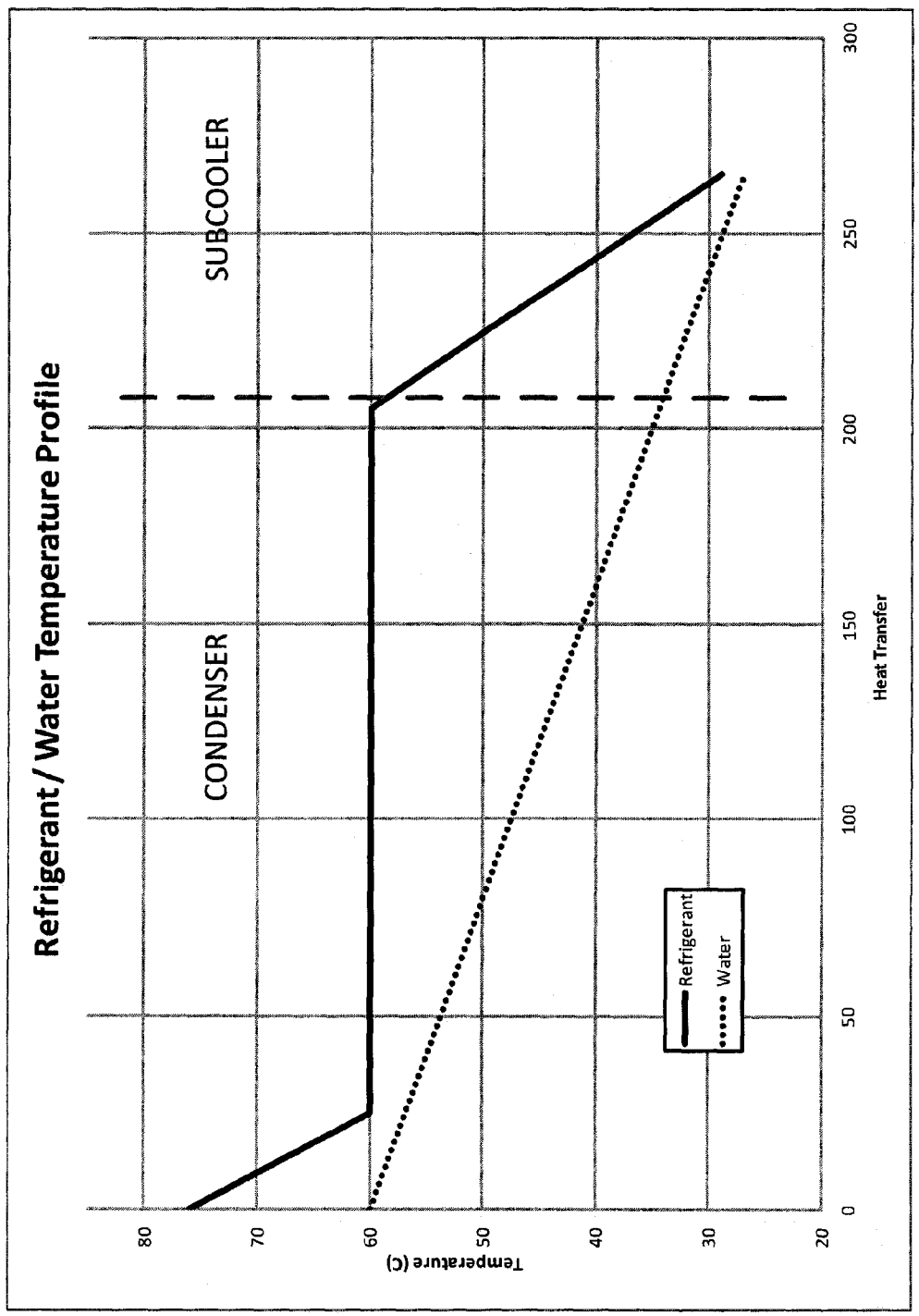
FIG. 7 is a graph showing the refrigerant/water temperature profile for a single condenser/subcooler pair.

Referring to FIG. 7, a refrigerant and water temperature profile is plotted on the same graph as a function of heat transferred for a single condenser/subcooler pair during an exemplary operation without directing the flow of water through the condensers in series. Accordingly, the condenser is required to operate at a higher pressure such that the condensation temperature is at about 60° C.

Figure 8:
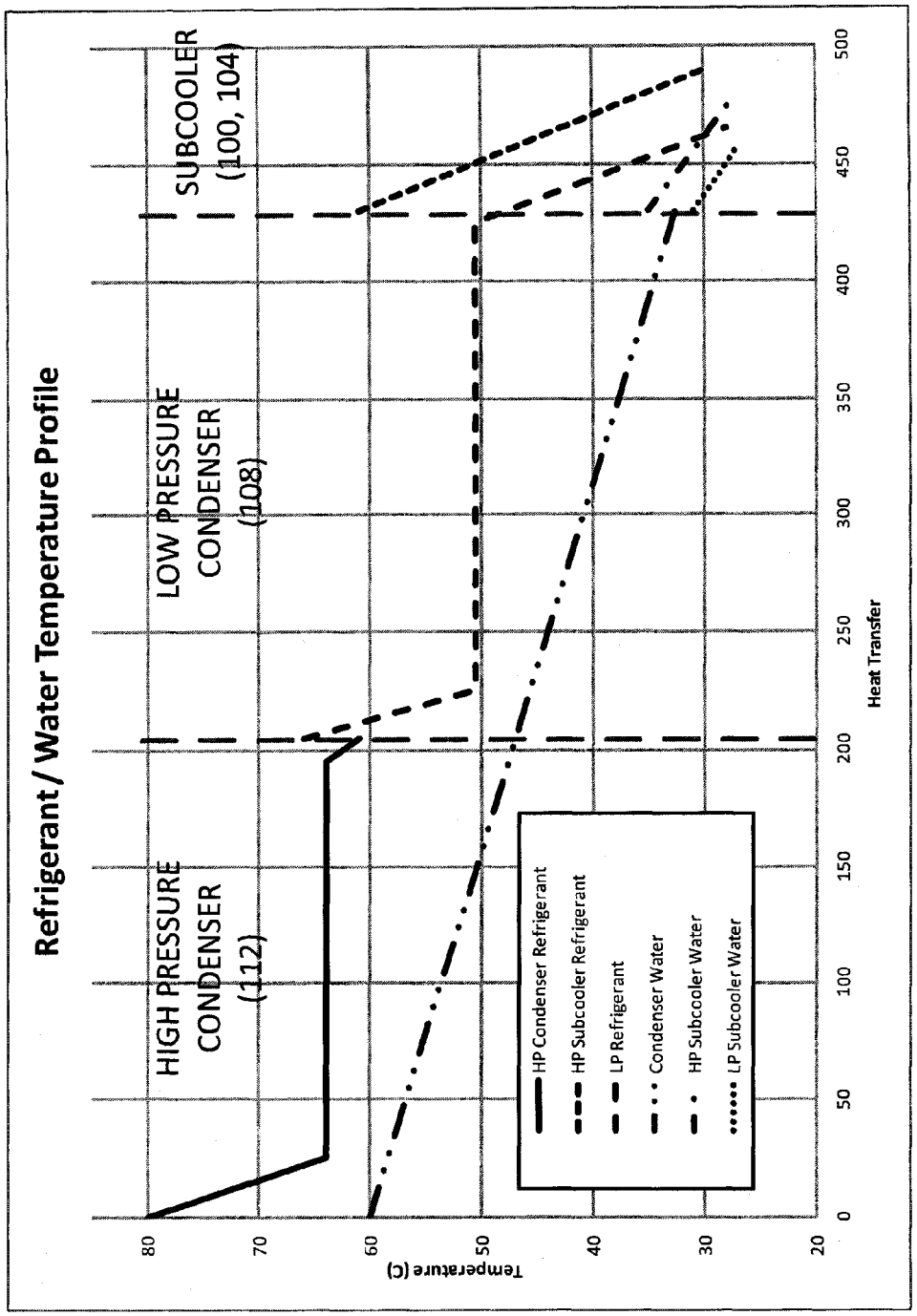
FIG. 8 is a graph showing the refrigerant/water temperature profile in the heat recovery system of the embodiment shown in FIG. 2.

Referring to FIG. 8, a refrigerant and water temperature profile is plotted on the same graph as a function of heat energy transferred for the heat recovery system 62 where the water is directed through two condensers in series during an exemplary operation. Accordingly, the first condenser can be operated at lower pressure such that the condensation temperature is at about 50° C. to step up the temperature of the water. The water is then passed to the second condenser having a higher condensation temperature to raise the temperature of the water to the predetermined temperature for delivery into the hot water tank 78.

Figure 9:
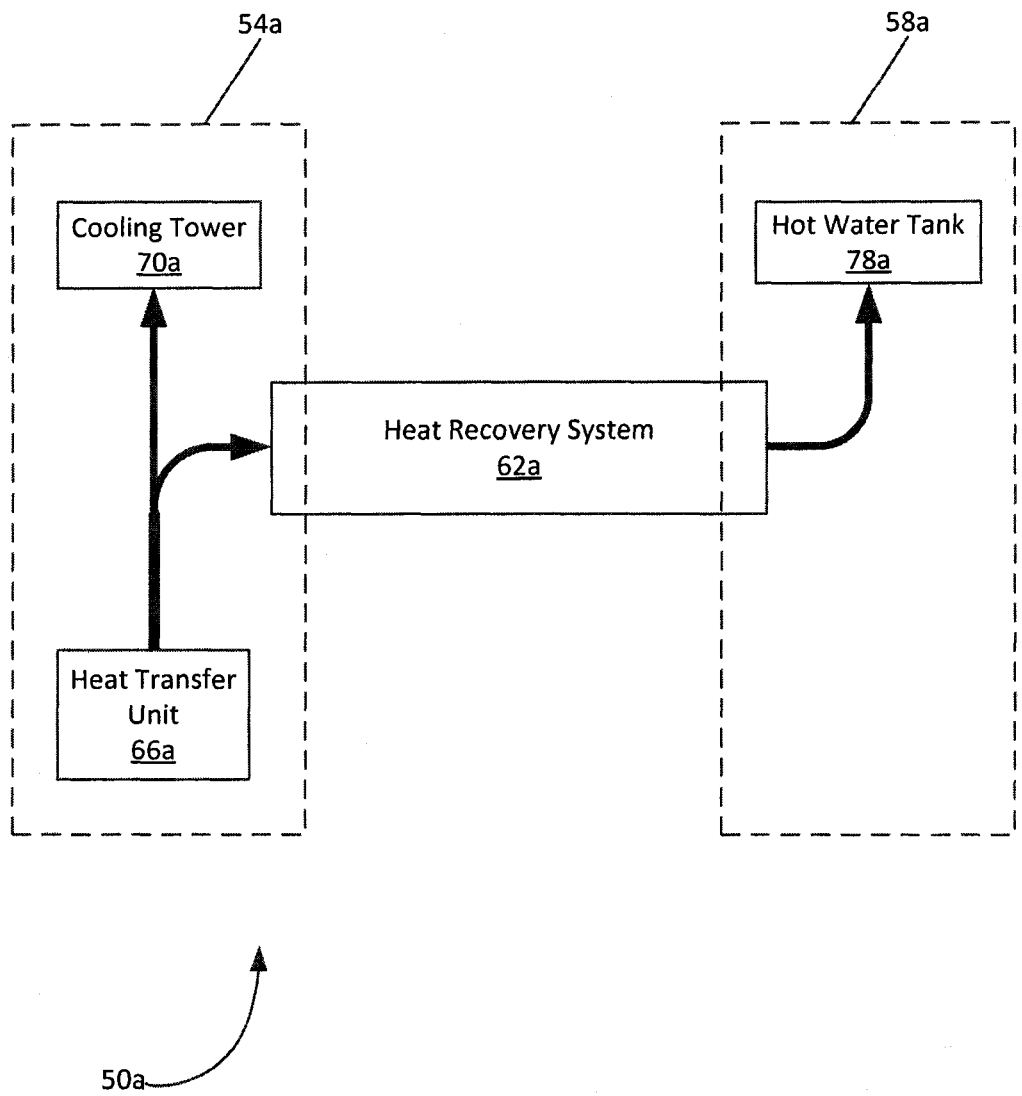
FIG. 9 is a schematic representation of an exemplary energy exchange system in accordance with another embodiment.

Referring to FIG. 9, another embodiment of an energy exchange system for transferring heat energy is shown generally at 50a. Like components of the energy exchange system 50a bear like reference to their counterparts in the energy exchange system 50, except followed by the suffix "a". The energy exchange system 50a includes a chiller system 54a, a hot water system 58a, and a heat recovery system 62a.

In the present embodiment, the hot water system 58a includes a hot water tank 78a without a boiler. It is to be appreciated, with the benefit of this description, that the energy exchange system 50a can operate without an additional boiler for providing hot water. In particular, the waste heat provided by the chiller system 54a can provide the heat recovery system 62a with sufficient heat energy to meet all the needs of the hot water system 58a. For example, if the energy exchange system 50a were installed in a building where the chiller system 54a is providing significant waste heat that can meet the building's need for hot water, a boiler would not be required in such a building. Examples of such buildings include buildings located in warm climates where the air conditioning use is high and the hot water use is relatively low.

Figure 10:
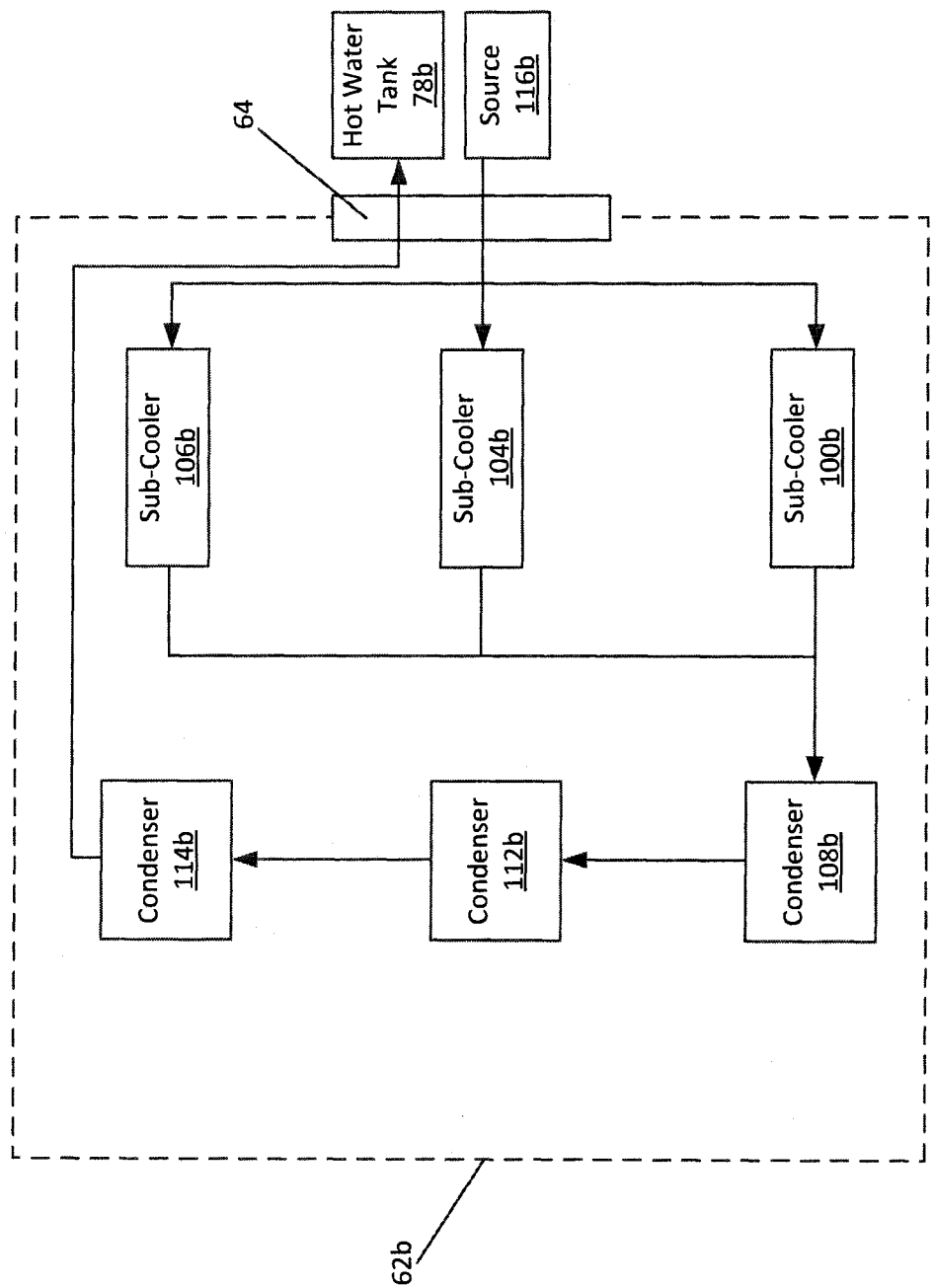
FIG. 10 is a schematic representation of water flow through the heat recovery system in accordance with another embodiment.

Referring to FIG. 10, a schematic representation showing the flow of water through another embodiment of a heat recovery system 62b is shown. Like components of the heat recovery system 62b bear like reference to their counterparts in the heat recovery system 62, except followed by the suffix "b". The heat recovery system 62b includes a first subcooler 100b, a second subcooler 104b, a third subcooler 106b, a first condenser 108b, a second condenser 112b, and a third condenser 114b.

In general, the heat recovery system 62b operates in a similar manner as the heat recovery system 62 with an additional step. By including an additional step, it is to be appreciated, with the benefit of this description, that additional energy savings can be obtained as the steps by which the temperature of the water is increased can be smaller. Furthermore, it is to be re-emphasized that this embodiment is a non-limiting representation only. For example, it is to be appreciated that the heat recovery system 62b can include more steps to achieve even greater energy savings.

Figure 11:
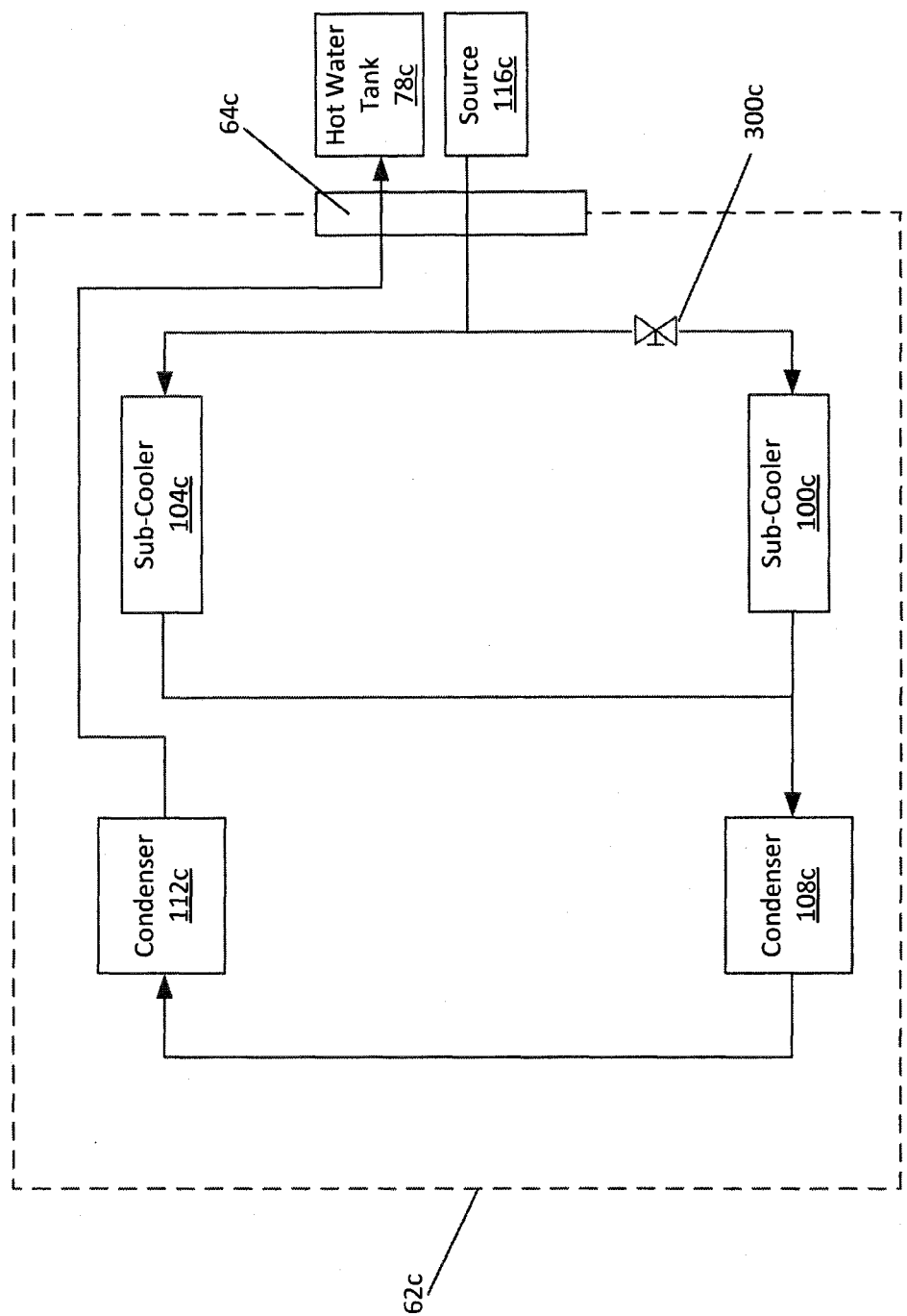
FIG. 11 is a schematic representation of water flow through the heat recovery system in accordance with another embodiment.

Further variations are contemplated. For example, as shown in FIG. 11, a schematic representation showing the flow of water through another embodiment of a heat recovery system 62c is shown. Like components of the heat recovery system 62c bear like reference to their counterparts in the heat recovery system 62, except followed by the suffix "c". The heat recovery system 62c includes a first subcooler 100c, a second subcooler 104c, a first condenser 108c, a second condenser 112c, and a valve 300c.

In this embodiment, a valve 300c is installed in between the water source 116c and the first subcooler 100c. The valve 300c is generally configured to control the flow of water to the first subcooler 100c. It is to be appreciated that the valve 300c allows the relative amounts of water passing through the first subcooler 100c and the second subcooler 104c to be controlled. Furthermore, during periods of low demand for hot water, the valve 300c can be shut off and the compressor (not shown) associated with the first condenser 108c can be powered down to achieve even greater energy savings.

Figure 12:
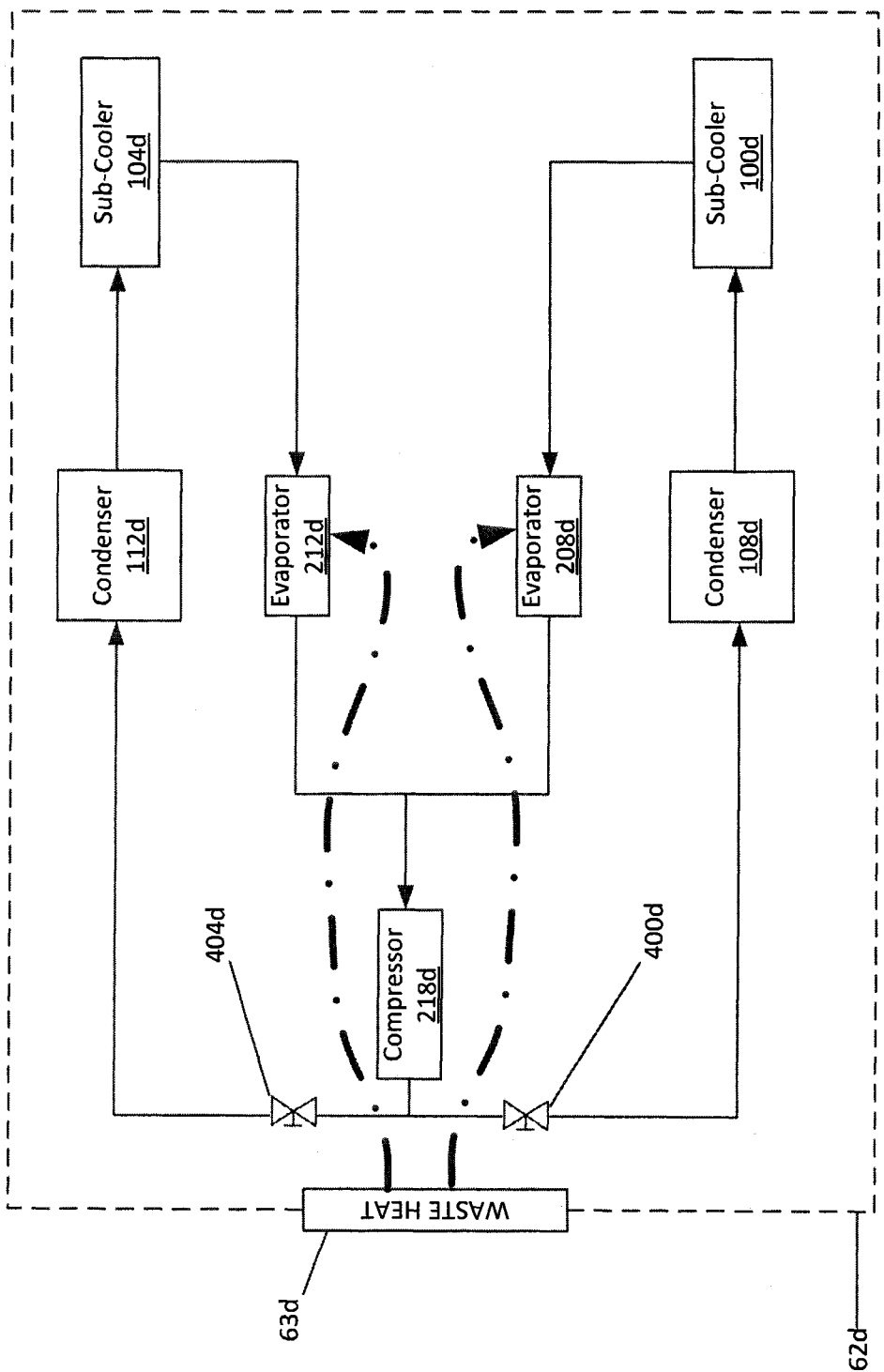
FIG. 12 is a schematic representation of refrigerant flow through the heat recovery system in accordance with another embodiment.

Referring to FIG. 12, a schematic representation showing the flow of refrigerant through another embodiment of a heat recovery system 62d is shown in greater detail. Like components of the heat recovery system 62d bear like reference to their counterparts in the heat recovery system 62, except followed by the suffix "d". In the present embodiment, a single compressor 218d is used to compress the refrigerant and a first valve 400d and a second valve 404d are used to control the pressure and amount of refrigerant flowing to a first condenser 108d and a second condenser 112d.

Further variations, combinations, and subsets of the foregoing will now occur to those skilled in the art. For example, the heat recovery system 62b can be combined with the heat recovery system 62d such that a single pump is used to control the refrigerant across the three condensers using valves. As another example, the heat recovery system 62b can be combined with the heat recovery system 62c such that one or two of the condenser/subcooler pairs can be shut down to achieve energy savings.

While specific embodiments have been described and illustrated, such embodiments should be considered illustrative only and should not serve to limit the accompanying claims.

What is claimed is:

1. A system for heating water, the system comprising:
   a first subcooler for receiving a first water flow, the first subcooler configured to transfer heat to the first water flow at a first heat transfer rate;
   a second subcooler for receiving a second water flow, the second subcooler configured to transfer heat to the second water flow at a second heat transfer rate;
   a first condenser in fluid communication with the first subcooler and the second subcooler, the first condenser configured to receive a combined water flow, the combined water flow including the first water flow from the first subcooler and the second water flow from the second subcooler, the first condenser configured to transfer heat to the combined water flow at a third heat transfer rate; and
   a second condenser in fluid communication with the first condenser, the second condenser configured to receive the combined water flow from the first condenser, the second condenser configured to transfer heat to the combined water flow at a fourth heat transfer rate.

2. The system of claim 1, wherein the first subcooler is configured to transfer heat from a first refrigerant to the first water flow and the first condenser is configured to transfer heat from the first refrigerant to the combined water flow.

3. The system of claim 2, wherein the second subcooler is configured to transfer heat from a second refrigerant to the second water flow and the second condenser is configured to transfer heat from the second refrigerant to the combined water flow.

4. The system of claim 3, further comprising a first evaporator and a second evaporator, the first evaporator for evaporating the first refrigerant and the second evaporator for evaporating the second refrigerant.

5. The system of claim 4, wherein at least one of the first evaporator and the second evaporator is configured to receive waste heat from a chiller system.

6. The system of claim 5, further comprising a first connector and a second connector, the first connector for connecting a cold water source to the first subcooler and the second subcooler to receive the water, the second connector for connecting the chiller system to the evaporator for receiving the waste heat.

7. The system of claim 6, wherein the second connector is configured to receive a liquid.

8. The system of claim 4, further comprising a first compressor and a second compressor, the first compressor for compressing the first refrigerant and the second compressor for compressing the second refrigerant.

9. The system of claim 8, wherein the second compressor compresses the second refrigerant to a higher pressure than the first compressor compresses the first refrigerant.

10. The system of claim 9, wherein the first condenser, the first subcooler, the first evaporator and the first compressor form a first refrigerant circuit.

11. The system of claim 10, wherein the first refrigerant circuit is a closed circuit.

12. The system of claim 1, wherein the first portion of water is equal to the second portion of water.

13. The system of claim 1, wherein the first heat transfer rate, the second heat transfer rate, the third heat transfer rate, and the fourth heat transfer rate are cumulatively sufficient for increasing a temperature of the combined water flow by at least 30° C.

14. The system of claim 13, wherein the first heat transfer rate, the second heat transfer rate, the third heat transfer rate, and the fourth heat transfer rate are cumulatively sufficient for increasing a temperature of the combined water flow by at least 35° C.

15. The system of claim 14, wherein the first heat transfer rate, the second heat transfer rate, the third heat transfer rate, and the fourth heat transfer rate are cumulatively sufficient for increasing a temperature of the combined water flow by at least 40° C.

16. A method of heating water, the method comprising:
   receiving, at a first subcooler, a first water flow;
   transferring heat at a first heat transfer rate to the first water flow through the first subcooler;
   receiving, at a second subcooler, a second the water flow;
   transferring heat at a second heat transfer rate to the second water flow through the second subcooler;
   receiving, at the first condenser, a combined water flow, the combined water flow including the first water flow from the first subcooler and the second water flow from the second subcooler;
   transferring heat at a third heat transfer rate to the combined water flow through the first condenser;
   receiving, at the second condenser, the combined water flow from the first condenser; and
   transferring heat at a third heat transfer rate to the combined water flow through the second condenser.

17. The method of claim 16, wherein transferring heat to the first water flow through the first subcooler and transferring heat to the combined water flow through the first condenser comprises transferring heat from a first refrigerant.

18. The method of claim 17, wherein transferring the heat to the second water flow through the second subcooler and transferring heat to the combined water flow through the second condenser comprises transferring heat from a second refrigerant.

19. The method of claim 18, further comprising compressing the second refrigerant to a higher pressure than the first compressor compresses the first refrigerant.

20. The method of claim 16, further comprising increasing a temperature of the water by at least 30° C. by transferring heat to the first water flow through the first subcooler, transferring heat to the second water flow through the second subcooler, transferring heat to the combined water flow through the first condenser, and transferring heat to the combined water flow through the second condenser.

* * * * *

UNITED STATES PATENT AND TRADEMARK OFFICE
CERTIFICATE OF CORRECTION

PATENT NO.        : 9,016,074 B2
APPLICATION NO.   : 13/837690
DATED             : April 28, 2015
INVENTOR(S)       : Sean Douglas Marte Page 1 of 1

It is certified that error appears in the above-identified patent and that said Letters Patent is hereby corrected as shown below:

In the Specification:

Column 1, line 46, add "." after the word --transfer rate--.
Column 2, line 27, delete the word "the" after --a second--.
Column 3, line 3, insert the word --of-- after --representation--.
Column 3, line 5, insert the word --of-- after --representation--.
Column 3, line 57, insert the word --to-- after --according--.
Column 6, line 54, the word "walled" should read --wall--.
Column 6, line 58, insert the word --which-- after --(not shown)--.
Column 6, line 62, delete the word "an" before the word --barrier--.
Column 7, line 36, insert the word --to-- after the word --used--.
Column 7, line 46, insert --108-- after the words --first condenser--.
Column 7, line 47, the word "particular" should read --particularly--.
Column 7, line 51, insert the word --water-- after the word --heated--.
Column 8, line 23, insert the word --is-- after --112--.
Column 8, line 25, delete the word "by" after the word --was--.
Column 8, line 25, insert the word --by-- after the word --added--.
Column 9, line 44, insert --54-- after the word --system--.
Column 9, line 49, the word "position" should read --positioning--.
Column 9, line 59, insert --62-- after the word --system--.
Column 10, line 14, delete the word "a" after the words --can be--.
Column 10, line 17, insert the word --the-- before the word --second--.
Column 10, line 53, insert the word --the-- after --108 and--.

In the Claims:

Column 14, line 25, Claim 16, delete the word "the".
Column 14, line 36, Claim 16, "third" should read --fourth--.

Signed and Sealed this
Fourteenth Day of June, 2016

Michelle K. Lee
*Director of the United States Patent and Trademark Office*